United States Patent
Corbell, Sr.

(10) Patent No.: US 10,605,231 B1
(45) Date of Patent: Mar. 31, 2020

(54) ELECTRIC TURBINE CHARGER SYSTEM

(71) Applicant: Wayne Douglas Corbell, Sr., New Port Richey, FL (US)

(72) Inventor: Wayne Douglas Corbell, Sr., New Port Richey, FL (US)

(*) Notice: Subject to any disclaimer, the term of this patent is extended or adjusted under 35 U.S.C. 154(b) by 20 days.

(21) Appl. No.: 16/142,484

(22) Filed: Sep. 26, 2018

(51) Int. Cl.
| | |
|---|---|
| *F03D 9/32* | (2016.01) |
| *B60L 8/00* | (2006.01) |
| *F03D 9/11* | (2016.01) |
| *F03D 13/20* | (2016.01) |
| *H02J 7/00* | (2006.01) |

(52) U.S. Cl.
CPC ............. *F03D 9/32* (2016.05); *B60L 8/006* (2013.01); *F03D 9/11* (2016.05); *F03D 13/20* (2016.05); *H02J 7/0055* (2013.01)

(58) Field of Classification Search
CPC ... F03D 9/32; F03D 9/11; F03D 13/20; B60L 8/006; H02J 7/0055
USPC ...................................................... 290/44, 55
See application file for complete search history.

(56) References Cited

U.S. PATENT DOCUMENTS

| | | | | |
|---|---|---|---|---|
| 4,254,843 A | * | 3/1981 | Han .................... | B60K 1/00 180/165 |
| 5,280,827 A | * | 1/1994 | Taylor .................. | B60K 1/04 180/165 |
| 6,857,492 B1 | * | 2/2005 | Liskey ................. | B60K 16/00 180/165 |
| 7,135,786 B1 | * | 11/2006 | Deets ................... | B60K 16/00 290/55 |
| 7,808,121 B1 | * | 10/2010 | Glynn .................. | B60L 8/006 290/55 |
| 8,436,485 B1 | * | 5/2013 | Smith .................. | F03D 9/11 290/55 |
| 8,664,782 B1 | * | 3/2014 | Kim .................... | F03D 15/20 290/1 R |
| 2010/0133845 A1 | * | 6/2010 | Moore .................. | F03D 9/25 290/55 |
| 2010/0181050 A1 | * | 7/2010 | Eisenhour ........... | B60K 11/02 165/121 |
| 2011/0101698 A1 | * | 5/2011 | Saluccio .............. | B60L 8/003 290/55 |
| 2011/0215584 A1 | * | 9/2011 | Prokopich ............ | F03D 9/00 290/55 |
| 2011/0285134 A1 | * | 11/2011 | Ortiz ................... | B60K 6/485 290/52 |
| 2012/0049525 A1 | * | 3/2012 | Owens ................. | B60L 8/006 290/50 |
| 2012/0286513 A1 | * | 11/2012 | Marano ............... | B60K 16/00 290/50 |
| 2012/0299526 A1 | * | 11/2012 | Lambert .............. | B60K 16/00 320/101 |
| 2013/0127393 A1 | * | 5/2013 | Garcia ................. | F03D 3/002 320/101 |

(Continued)

*Primary Examiner* — Viet P Nguyen

(57) ABSTRACT

A support assembly secured to a vehicle has a fixedly positioned exterior tube, an interior tube removably received in the exterior tube, an open input, and an open output. A support shaft is positioned in the interior tube. A plurality of bearings support the support shaft for rotational movement. A plurality of fans are mounted on the support shaft for rotation in response to airflow through the support assembly. A plurality of alternators/generators are mounted on the support shaft for generating electricity. An electrical assembly has a plurality of batteries and a controller coupling the alternators/generators and the batteries.

4 Claims, 4 Drawing Sheets

(56) References Cited

U.S. PATENT DOCUMENTS

2013/0154271 A1* 6/2013 Knickerbocker ...... B60K 16/00
290/55

* cited by examiner

ELECTRIC TURBINE CHARGER SYSTEM

RELATED APPLICATION

The present application is based upon and claims the benefit of Provisional Application No. 62/542,894, filed Aug. 9, 2017, the subject matter of which is incorporated herein by reference.

BACKGROUND OF THE INVENTION

Field of the Invention

The present invention relates to an electric turbine charger system and more particularly pertains to utilizing a vehicular airflow to recharge a vehicle battery and to powering the vehicle with the recharged battery in a safe, ecological, convenient, and economical manner.

DESCRIPTION OF THE PRIOR ART

The use of vehicle battery charging systems of known designs and configurations is known in the prior art. More specifically, vehicle battery charging systems of known designs and configurations previously devised and utilized for the purpose of recharging a vehicle battery are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe an electric turbine charger system that allows utilizing a vehicular airflow to recharge a vehicle battery and to powering the vehicle with the recharged battery in a safe, ecological, convenient, and economical manner.

In this respect, the electric turbine charger system according to the present invention substantially departs from the conventional concepts and designs of the prior art, and in doing so provides an apparatus primarily developed for the purpose of utilizing a vehicular airflow to recharge a vehicle battery and to powering the vehicle with the recharged battery in a safe, ecological, convenient, and economical manner.

Therefore, it can be appreciated that there exists a continuing need for a new and improved electric turbine charger system which can be used for utilizing a vehicular airflow to recharge a vehicle battery and to powering the vehicle with the recharged battery in a safe, ecological, convenient, and economical manner. In this regard, the present invention substantially fulfills this need.

SUMMARY OF THE INVENTION

In view of the disadvantages inherent in the known types of vehicle battery charging systems of known designs and configurations now present in the prior art, the present invention provides an improved electric turbine charger system. As such, the general purpose of the present invention, which will be described subsequently in greater detail, is to provide a new and improved electric turbine charger system and method which has all the advantages of the prior art and none of the disadvantages.

To attain this, from a broad perspective, the present invention essentially comprises a support assembly secured to a vehicle. The support assembly has a fixedly positioned exterior tube and also has an interior tube removably received in the exterior tube. The support assembly has an open input and an open output. A support shaft is provided positioned in the interior tube. A plurality of bearings support the support shaft for rotational movement. A plurality of fans are mounted on the support shaft for rotation in response to airflow through the support assembly. A plurality of alternators/generators are mounted on the support shaft for generating electricity. An electrical assembly has a plurality of batteries and a controller coupling the alternators/generators and the batteries. Such components are individually configured and correlated with respect to each other so as to attain the desired objective.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved electric turbine charger system which has all of the advantages of the prior art vehicle battery charging systems of known designs and configurations and none of the disadvantages.

It is another object of the present invention to provide a new and improved electric turbine charger system which may be easily and efficiently manufactured and marketed.

It is a further object of the present invention to provide a new and improved electric turbine charger system which is of durable and reliable constructions.

An even further object of the present invention is to provide a new and improved electric turbine charger system which is susceptible of a low cost of manufacture with regard to both materials and labor, and which accordingly is then susceptible of low prices of sale to the consuming public, thereby making such electric turbine charger system economically available to the buying public.

Lastly, it is an object of the present invention to provide an electric turbine charger system utilizing a vehicular airflow to recharge a vehicle battery and to power the vehicle with the recharged battery in a safe, ecological, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
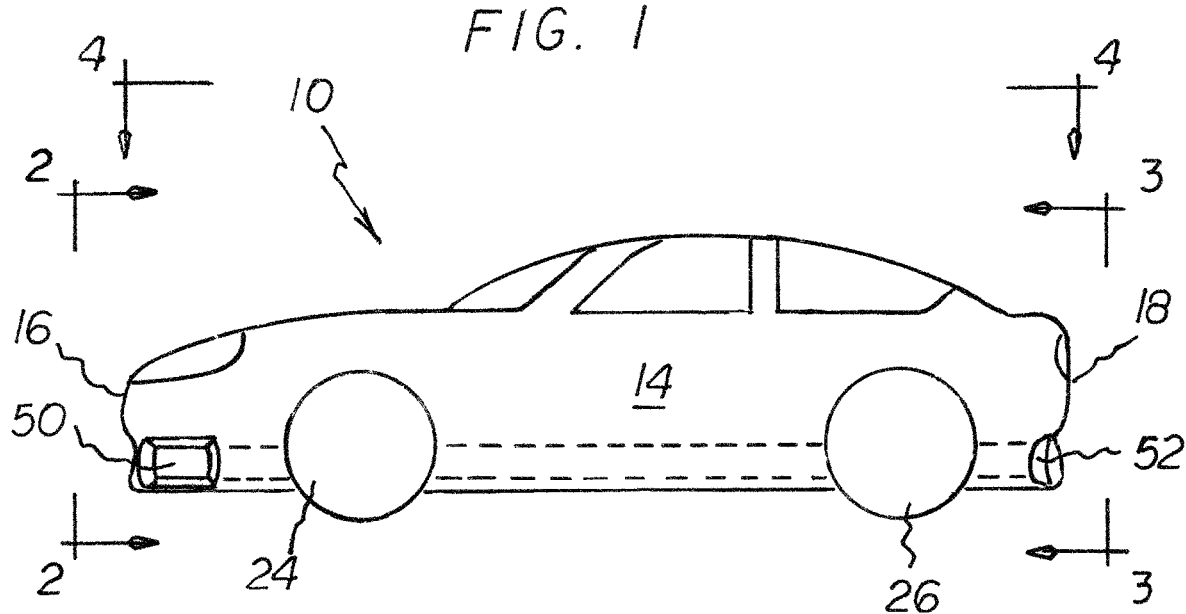
FIG. 1 is a side elevational view of an electric turbine charger system constructed in accordance with the principles of the present invention.
Figure 2:
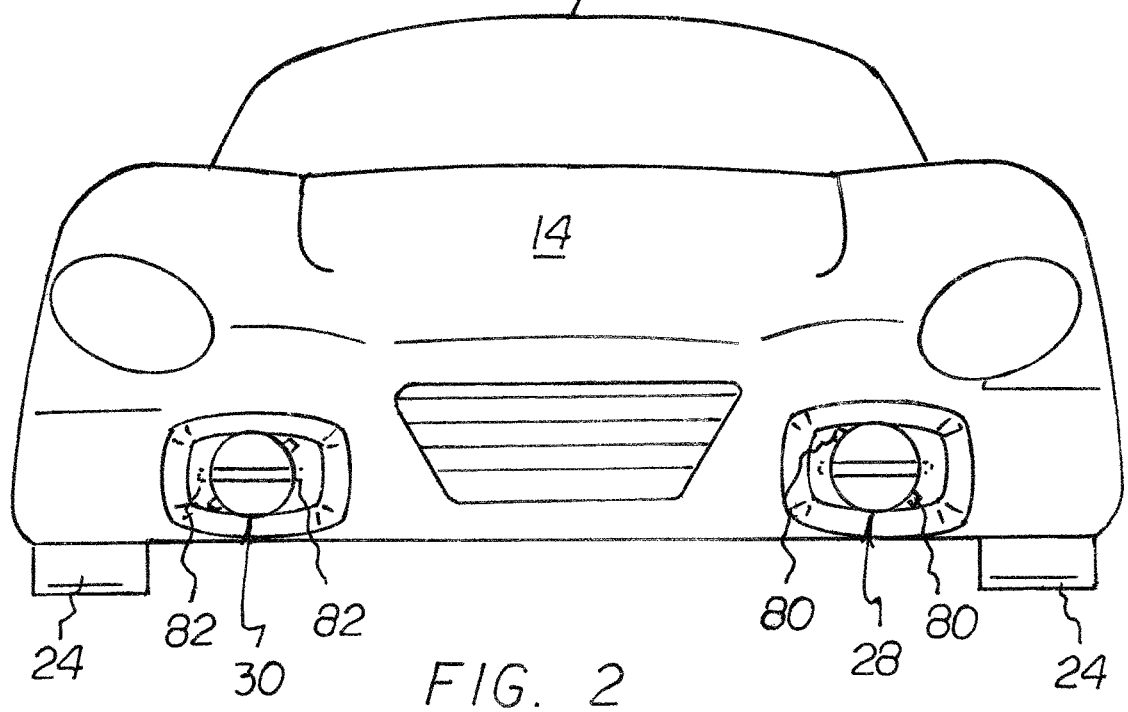
FIG. 2 is a front elevational view taken along line 2-2 of FIG. 1.
Figure 3:
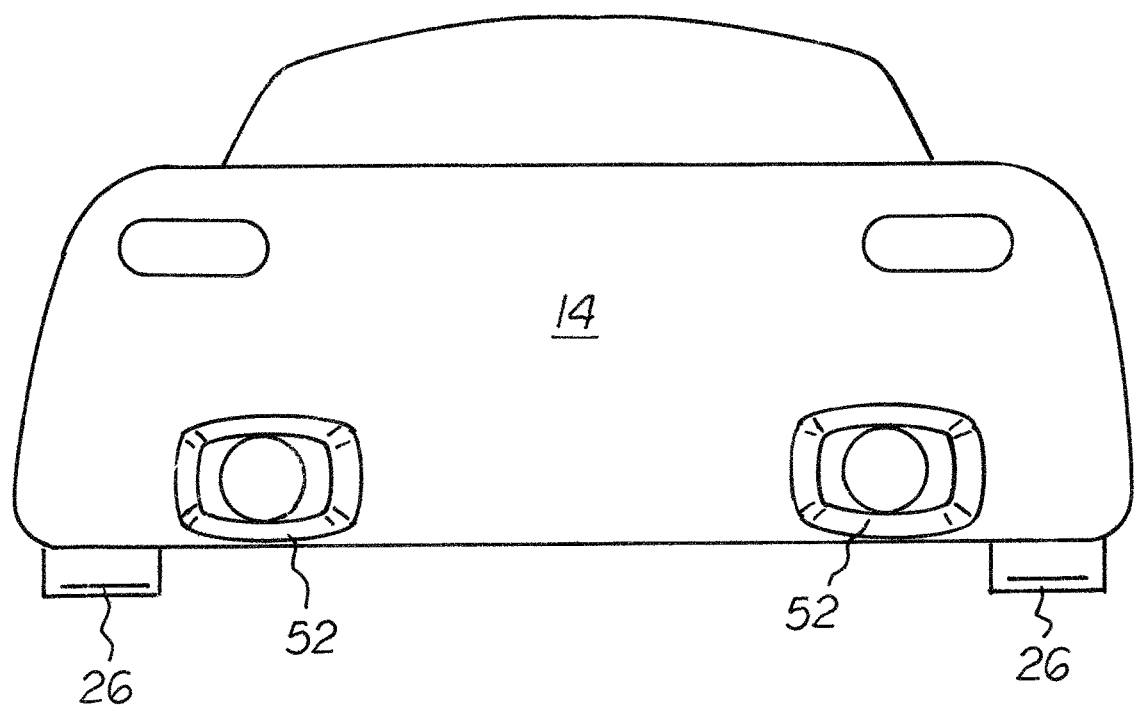
FIG. 3 is a rear elevational view taken along line 3-3 of FIG. 1.
Figure 4:
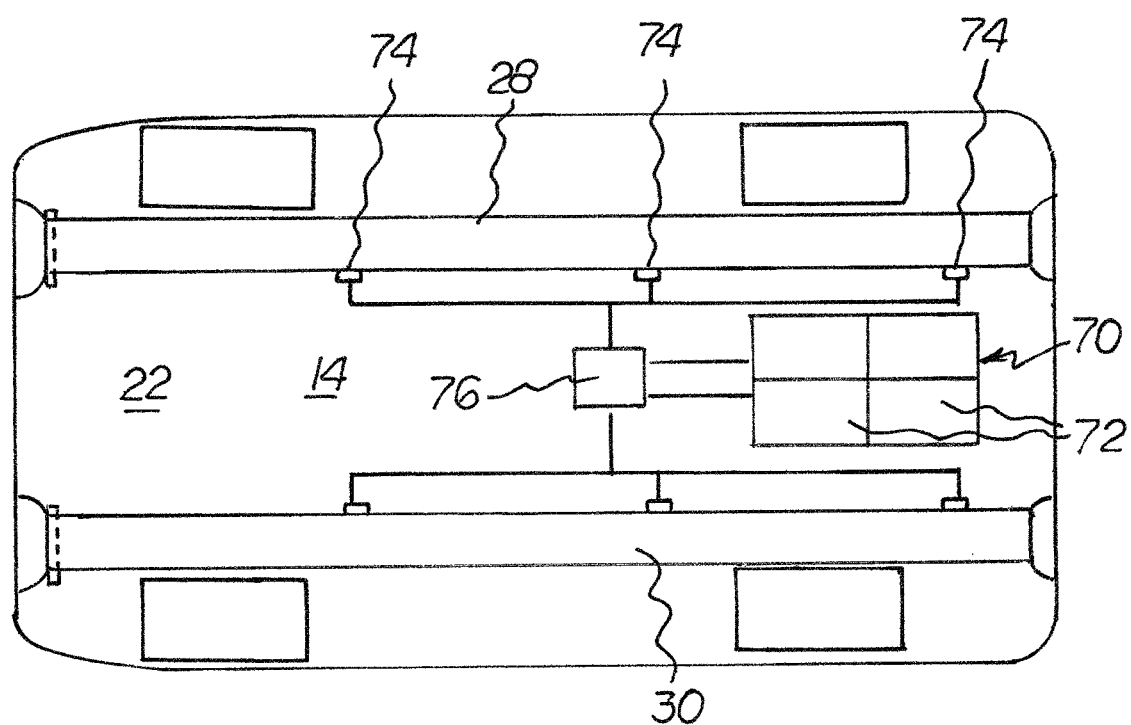
FIG. 4 is a bottom view taken along line 4-4 of FIG. 1.
Figure 5:
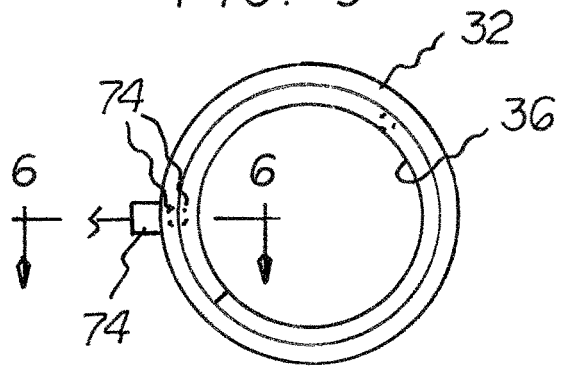
FIG. 5 is a cross-sectional view of the interior tube and the exterior tube shown in the prior Figures.
Figure 6:
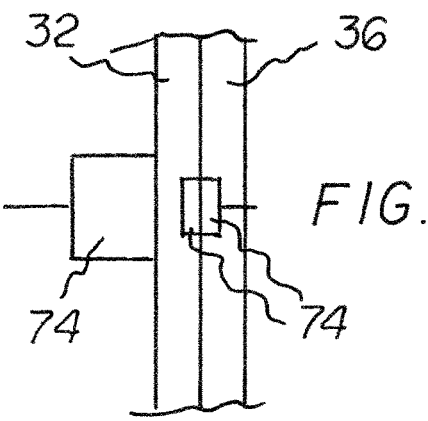
FIG. 6 is a cross-sectional view taken along line 6-6 of FIG. 5.
Figure 7:
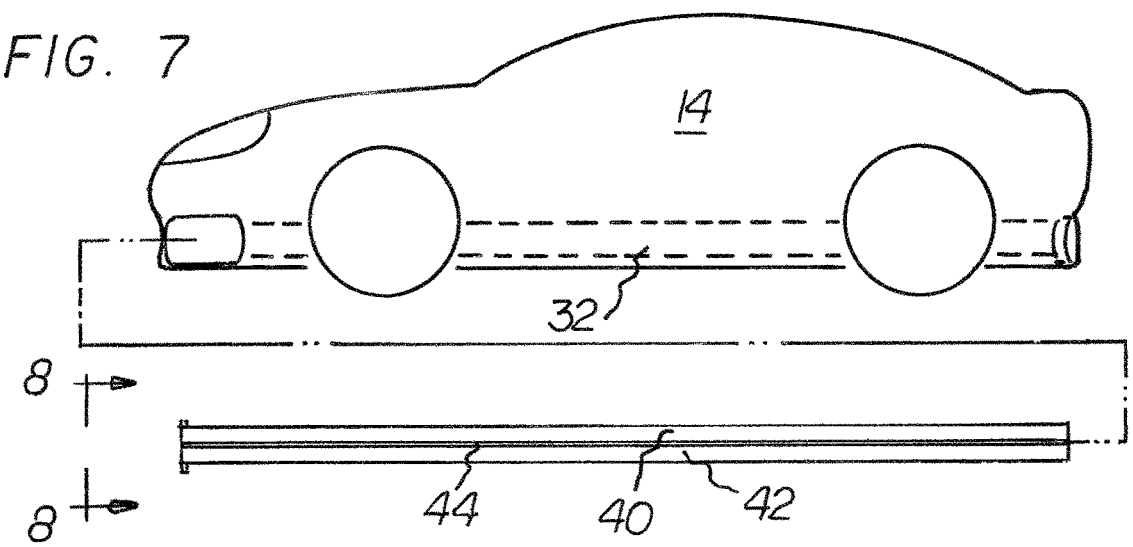
FIG. 7 is a side elevational view similar to FIG. 1 but with the interior tube removed.
Figure 8:
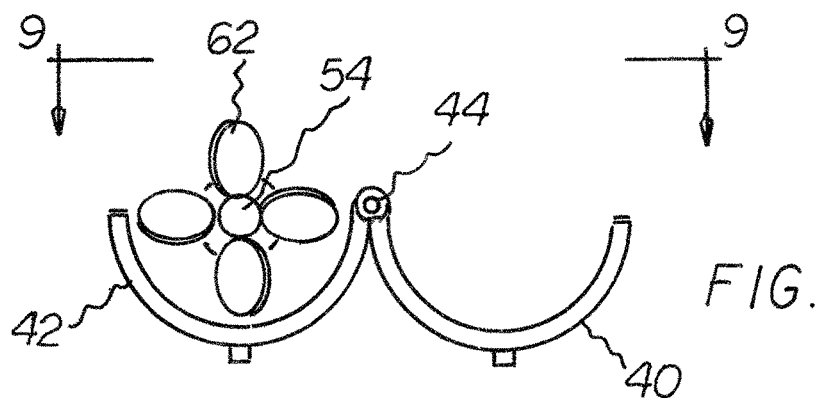
FIG. 8 is an end elevational view taken along line 8-8 of FIG. 7.
Figure 9:
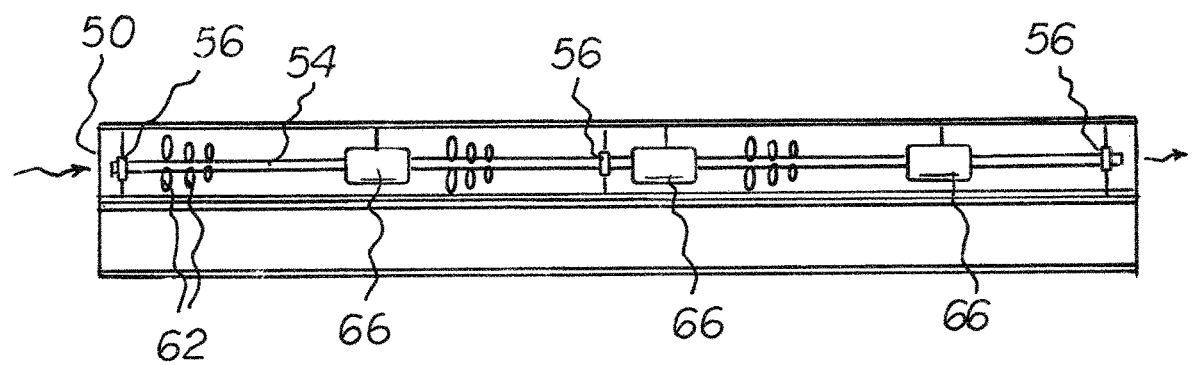
FIG. 9 is a plan view taken along line 9-9 of FIG. 8.
Figure 10:
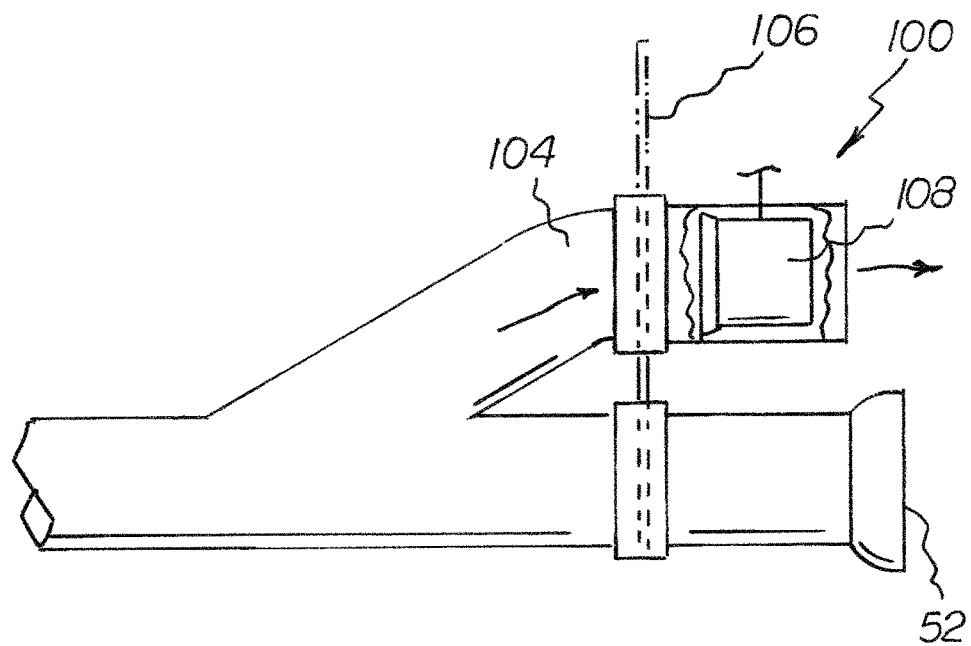
FIG. 10 is a side elevational view of an alternate embodiment of the invention.

With reference now to the drawings, and in particular to FIG. 1 thereof, the preferred embodiment of the new and improved electric turbine charger system embodying the principles and concepts of the present invention and generally designated by the reference numeral 10 will be described.

The present invention, the electric turbine charger system 10 is comprised of a plurality of components. Such components in their broadest context include a support assembly, a support shaft, and an electrical assembly. Such components are individually configured and correlated with respect to each other so as to attain the desired objective.

From a specific perspective, the invention of the present application is an electric turbine charger system, designated by reference numeral 10. First provided is a vehicle 14 having a forward end 16, a rearward end 18, an upper surface 20, a lower surface 22, two front wheels 24, and two rear wheels 26. Next provided is a left support assembly 28 and a similarly configured right support assembly 30. Each support assembly is secured to the lower surface of the vehicle. Each support assembly has a fixedly positioned exterior tube 32. Each support assembly also has an interior tube 36 removably received in an associated exterior tube. Each interior tube has an upper semi-cylindrical section 40, a lower semi-cylindrical section 42, and a hinge 44 coupling the upper semi-cylindrical section and the lower semi-cylindrical section. Each support assembly has an open input 50 adjacent to the forward end of the vehicle. Each support assembly also has an open output 52 adjacent to the rearward end of the vehicle.

Next provided are support shafts 54. Each support shaft is positioned in one of the interior tubes. A plurality of ceramic bearings 56 support each support shaft for rotational movement. A plurality of fans 62 are mounted on each support shaft for rotation in response to airflow through each support assembly. A plurality of alternators/generators 66 are mounted on each support shaft for generating electricity.

An electrical assembly 70 is next provided. The electrical assembly has a plurality of batteries 72. A plurality of contacts 74 are operatively coupled to each of the left exterior tubes and each left exterior tube's associated right exterior tube. The electrical assembly also includes a controller 76 coupling the alternators/generators and the batteries.

Lastly, a pair of projections 80 are provided on each interior tube adjacent to the input. A pair of recesses 82 are provided in each exterior tube adjacent to the input. Each interior tube is rotatable to an unlocking orientation with respect to an associated exterior tube to align the pairs of projections with the pairs of recesses for coupling and uncoupling the interior tubes with respect to the exterior tubes. Each interior tube is rotatable to a locking orientation with respect to an associated exterior tube to dis-align the pairs of projections with the pairs of recesses for locking the interior tubes with respect to the exterior tubes.

An alternate embodiment of the system 100 further includes a supplemental air flow path 104 for the support assembly adjacent to and parallel with the interior tube. A reciprocable plate 106 is operatively coupled to the support assembly to block the flow of air through the supplemental air flow path while allowing air flow through the interior tube during movement of the vehicle. The reciprocable plate is operatively coupled to the support assembly to allow the flow of air through the supplemental air flow path while blocking air flow through the interior tube during non-movement of the vehicle. A fan 108 in the supplemental air flow path draws air through the interior tube when the vehicle is not moving.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An electric turbine charger system comprising:
   a support assembly secured to a vehicle, the support assembly having a fixedly positioned exterior tube and an interior tube removably received in the exterior tube, the support assembly having an open input and an open output;
   a support shaft positioned in the interior tube with a plurality of bearings supporting the support shaft for rotational movement, a plurality of fans mounted on the support shaft for rotation in response to airflow through the support assembly, a plurality of alternators/generators mounted on the support shaft for generating electricity;

an electrical assembly having a plurality of batteries and a controller coupling the alternators/generators and the batteries; and a pair of projections on the interior tube adjacent to the input, a pair of recesses in the exterior tube adjacent to input, the interior tube being rotatable to an unlocking orientation with respect to the exterior tube to align the pair of projections with the pair of recesses for coupling and uncoupling the interior tube with respect to the exterior tube, the interior tube being rotatable to a locking orientation with respect to the exterior tube to dis-align the pair of projections with the pair of recesses for locking the interior tube with respect to the exterior tube.

2. The system as set forth in claim 1 and further including:

a second support assembly configured the same as the first mentioned support assembly, the first mentioned support assembly and the second support assembly coupled to a vehicle.

3. An electric turbine charger system (100) comprising:

a support assembly secured to a vehicle, the support assembly having a fixedly positioned exterior tube and an interior tube removably received in the exterior tube, the support assembly having an open input and an open output;

a support shaft positioned in the interior tube with a plurality of bearings supporting the support shaft for rotational movement, a plurality of fans mounted on the support shaft for rotation in response to airflow through the support assembly, a plurality of alternators/generators mounted on the support shaft for generating electricity;

an electrical assembly having a plurality of batteries and a controller coupling the alternators/generators and the batteries;

a supplemental air flow path (104) for the support assembly adjacent to and parallel with the interior tube;

a reciprocable plate (106) operatively coupled to the support assembly to block the flow of air through the supplemental air flow path while allowing air flow through the interior tube during movement of the vehicle, the reciprocable plate operatively coupled to the support assembly to allow the flow of air through the supplemental air flow path while blocking air flow through the interior tube during non-movement of the vehicle; and a fan (108) in the supplemental air flow path to draw air through the interior tube when the vehicle is not moving.

4. An electric turbine charger system (10) for utilizing a vehicular airflow to recharge a vehicle battery and for powering a vehicle with the recharged battery, the system comprising, in combination:

a vehicle (14) having a forward end (16) and a rearward end (18) and an upper surface (20) and a lower surface (22), the vehicle also having two front wheels (24) and two rear wheels (26);

a left support assembly (28) and a similarly configured right support assembly (30), each support assembly secured to the lower surface of the vehicle, each support assembly having a fixedly positioned exterior tube (32), each support assembly having an interior tube (36) removably received in an associated exterior tube, each interior tube having an upper semi-cylindrical section (40) and a lower semi-cylindrical section (42) and a hinge (44) coupling the upper semi-cylindrical section and the lower semi-cylindrical section;

each support assembly having an open input (50) adjacent to the forward end of the vehicle, each support assembly having an open output (52) adjacent to the rearward end of the vehicle;

a support shaft (54) positioned in each interior tube, a plurality of ceramic bearings (56) supporting each support shaft for rotational movement, a plurality of fans (62) mounted on each support shaft for rotation in response to airflow through each support assembly, a plurality of alternators/generators (66) mounted on each support shaft for generating electricity;

an electrical assembly (70) having a plurality of batteries (72), a plurality of contacts (74) operatively coupled to each left exterior tube and to the associated right exterior tube, the electrical assembly also including a controller (76) coupling the alternators/generators and the batteries; and a pair of projections (80) on each interior tube adjacent to the input, a pair of recesses (82) in each exterior tube adjacent to input, each interior tube being rotatable to an unlocking orientation with respect to an associated exterior tube to align the pairs of projections with the pairs of recesses for coupling and uncoupling the interior tubes with respect to the exterior tubes, each interior tube being rotatable to a locking orientation with respect to an associated exterior tube to dis-align the pairs of projections with the pairs of recesses for locking the interior tubes with respect to the exterior tubes.

* * * * *